United States Patent
Holtorf et al.

(10) Patent No.: US 10,273,007 B2
(45) Date of Patent: Apr. 30, 2019

(54) GALLEY ASSEMBLY FOR A CABIN OF A VEHICLE, A CABIN OF A VEHICLE, AND AN AIRCRAFT HAVING A CABIN AND AT LEAST ONE SUCH GALLEY ASSEMBLY

(71) Applicant: Airbus Operations GmbH, Hamburg (DE)

(72) Inventors: Boris Holtorf, Hamburg (DE); Rodrigo Espinoza, Hamburg (DE)

(73) Assignee: AIRBUS OPERATIONS GMBH, hamburg (DE)

( * ) Notice: Subject to any disclaimer, the term of this patent is extended or adjusted under 35 U.S.C. 154(b) by 691 days.

(21) Appl. No.: 14/699,061

(22) Filed: Apr. 29, 2015

(65) Prior Publication Data
US 2015/0321762 A1 Nov. 12, 2015

(30) Foreign Application Priority Data
May 8, 2014 (EP) .................................... 14167579

(51) Int. Cl.
*B64D 11/00* (2006.01)
*B64D 11/04* (2006.01)
*B64D 13/04* (2006.01)

(52) U.S. Cl.
CPC .......... *B64D 11/04* (2013.01); *B64D 11/0007* (2013.01); *B64D 13/04* (2013.01)

(58) Field of Classification Search
CPC .... B64D 11/04; B64D 11/0007; B64D 13/04; A47B 87/00; A47B 83/001; E04C 2/523
USPC .......................................................... 454/76
See application file for complete search history.

(56) References Cited

U.S. PATENT DOCUMENTS

| | | | | |
|---|---|---|---|---|
| 4,494,525 A | * | 1/1985 | Albertsen | F23B 5/00 110/203 |
| 4,860,642 A | * | 8/1989 | Nussbaum | F24F 1/00 454/233 |
| 5,826,613 A | * | 10/1998 | Schalk | F16K 1/123 137/219 |
| 2003/0042361 A1 | | 3/2003 | Simadiris et al. | |
| 2008/0156028 A1 | | 7/2008 | Cur et al. | |
| 2013/0001359 A1 | * | 1/2013 | Schliwa | B64D 11/02 244/118.6 |

(Continued)

FOREIGN PATENT DOCUMENTS

DE 102009030743 A1 12/2010

OTHER PUBLICATIONS

European Patent Office, European Search Report for European Patent Application No. 14167579.3 dated Oct. 27, 2014.

*Primary Examiner* — Steven B McAllister
*Assistant Examiner* — Allen R Schult
(74) *Attorney, Agent, or Firm* — Lorenz & Kopf LLP

(57) ABSTRACT

A galley assembly for a cabin of a vehicle includes a galley housing having a front side and a plurality of compartments capable for housing kitchen appliances, an air suction port, an air extraction manifold having a bypass element, and a mechanical control device. Each compartment has a ventilation port. The air suction port is pneumatically coupled with the air extraction manifold, which is coupled with the ventilation ports of the compartments. The bypass element is positioned on one of the plurality of walls facing away from the front side and it selectively provides a through-flow opening with an adjustable opening area to the surrounding of the galley assembly.

10 Claims, 3 Drawing Sheets

(56) References Cited

U.S. PATENT DOCUMENTS

2015/0251761 A1\* 9/2015 Vandyke ................ A47B 31/02
62/56

\* cited by examiner

GALLEY ASSEMBLY FOR A CABIN OF A VEHICLE, A CABIN OF A VEHICLE, AND AN AIRCRAFT HAVING A CABIN AND AT LEAST ONE SUCH GALLEY ASSEMBLY

REFERENCE TO RELATED APPLICATIONS

This application claims priority of European Patent Application EP 14 167 579.3, filed 8 May 2014, which is incorporated herein by reference in its entirety.

TECHNICAL FIELD

The embodiments described herein relate to a galley assembly for a cabin of a vehicle, to a cabin of a vehicle, and to an aircraft having a cabin and at least one such galley assembly.

BACKGROUND

Commercial aircraft often comprise galley units having multi purpose compartments, which may be individually equipped for the aircraft operator and also modified during the service life of the aircraft. Hence, oven compartments may be converted into a compartment for a freezer, standard units and so on.

For removal of odors and steam, air extraction from the ovens is necessary. For this purpose, the respective compartments comprise a ventilation port, which is coupled with an air extraction line coupled with the galley. The extraction provides air suction with a certain flow rate and pressure difference, wherein the conveyed air flow rate is equal to the maximum design flow rate. Due to the modularity of the galley, the air suction demand may vary from one galley setup to another. In order to maintain a total air flow rate for which the ventilation system is calibrated, it is common to use a bypass having an open through-flow surface to the surrounding of the galley instead of a ventilation port in case one or more of the multi purpose compartments do not require air extraction.

The opening for such a bypass is commonly located as far from the cabin as possible to prevent disturbance in the cabin due to the suction noises. Commonly, it is located at a back side of the respective galley and is to be adjusted after installation or modification of the galley. Compact galleys with an increased catering volume, which are optimized for being arranged directly in front of a pressure bulkhead may not be able to provide such a bypass location.

In addition, other objects, desirable features and characteristics will become apparent from the subsequent summary and detailed description, and the appended claims, taken in conjunction with the accompanying drawings and this background.

SUMMARY

It is an object of the embodiment to provide a galley assembly for a cabin of a vehicle, which comprises an alternate position of a ventilation bypass opening, which is adjustable during service life of the vehicle.

A galley assembly for a cabin of a vehicle is proposed, the galley assembly comprising a galley housing, a front side and a plurality of compartments capable for housing kitchen appliances. The galley assembly further comprises an air suction port, an air extraction manifold having a bypass means, and a mechanical control means. Each compartment comprises a ventilation port. The air suction port is pneumatically coupled with the air extraction manifold, which is coupled with the ventilation ports of the compartments. The bypass means is positioned on an outer surface of the galley assembly facing away from the front side and is adapted for selectively providing a through-flow opening with an adjustable opening area to the surrounding of the galley assembly. The control means is coupled with the bypass means and is adapted for adjusting the opening area of the through-flow opening. The control means is arranged on an outer surface and extends from the bypass means into the direction of the front side.

The galley housing is to be understood as a frame and/or a case, which defines the outer contour of the galley and holds all necessary components and that may comprise a plurality of walls. For providing delimitation especially to sides of the galley that do not fall into the front side, the plurality of walls is used. For example, in case the galley is adapted for being installed directly in front of the pressure bulkhead of an aircraft cabin and extends from one side of the cabin to the other, the galley may be able to carry the air extraction manifold having the bypass means on a top side, which may comprise a wall or another delimiting element.

The air suction port may be an inlet, to which an air suction line is attachable, which extends to or into the galley. It is conceivable that the air suction port is present on the air extraction manifold. However, it may be possible to provide the air suction port on a different position than the air extraction manifold and to couple the air extraction manifold and the air suction port by means of a duct or a pipe.

Each compartment comprises a ventilation port, which may simply be a single opening or a set of openings, which may be arranged in a grid. The ventilation ports are coupled with the air extraction manifold especially by means of a duct having a number of branch lines, by a set of individual ducts or by a combination of individual ducts and common ducts. Hence, through application of a negative pressure in the air extraction manifold, air is sucked through the ventilation ports into the air extraction manifold and into the air suction port. Steam and odors of kitchen appliances arranged in ventilated compartments will be drawn into the air suction port.

However, as mentioned previously, during the service life of the vehicle, the requirements for kitchen appliances may change. In case not all of the pluralities of compartments are equipped with kitchen appliances, ventilation in those compartments is not desired. For this purpose, it is a common approach to close the ventilation ports of those compartments through a cover plate, which leads to the necessity for compensating the lack of air flow rate sucked into the air suction port.

The compensation is conducted through using the bypass means, which provides an adjustable through-flow opening area facing away from the cabin, i.e. the front side of the galley section. By adjusting the area of the through-flow opening to a state somewhere between zero (fully closed) and a maximum, depending on the number of installed kitchen appliances, the flow resistance of the opening is changed. Due to coupling the bypass means and the ventilation ports to the same air suction port, the air flow rate required for the compensation may depend on a correct relationship between the flow resistances between the air suction port and the ventilation ports as well as between the air suction port and the bypass means. Hence, through choosing an appropriate through-flow opening area the correct flow rate is achieved through the bypass means and the compensation is achieved.

The mechanical control means is coupled with the bypass means for adjusting the through-flow opening and may be realized as a lever, a rod, a shaft or a group of suitable mechanical elements constituting a kinematical chain that allows the bypass means to be adjusted from a position remote from the bypass means. As the bypass means is located at a place, which is hard to reach, the control means offers a rather easy way for conducting the adjustment. This is especially the case for a galley assembly having a galley housing that is adapted for a placement directly in front of a pressure bulkhead of the aircraft cabin. An air suction port may only be provided on a top end of the galley housing and the bypass means is hardly accessible from a rear side of the galley. The control means provides a "remote control" operation of the bypass means, which also resides on the top of the galley housing.

A gist of the embodiment lies in providing the control means on a top surface of the galley housing, which extends from a bypass means located at a region facing away from the front side of the galley housing to a region near the front side, which may be reached from the front side, either directly or over an access to the top end through an opening in the ceiling. Hence, the galley assembly according to the embodiment provides a simple and reliable means for adjusting the ventilation bypass of an individual setup of the galley assembly even with the galley section being arranged directly in front of a pressure bulkhead.

In a preferred embodiment, the control means is mechanically coupled with the bypass means and the operating end is adapted for being gripped by a user for adjusting the bypass means. The mechanical coupling provides a transfer of motion from the operating end to the bypass means. Depending on the design of the bypass means, the user may adjust the area of the through-flow opening by moving the operating end in a predetermined way, which includes linear movements along at least one direction, as well as a rotation around at least one rotational axis. Any kind of motion is possible, as long as a unique and predetermined relationship between geometrical position of the operating end and the opening state of the through-flow opening is given. Consequently, also a combination of linear movements and rotation may also be possible.

In an advantageous embodiment, the bypass means comprises a slider, which is adapted for adjusting an opening degree of the through-flow opening by moving the slider to selectively block or unblock parts of the through-flow opening, wherein the control means is movably supported on the galley housing and comprises a joint connected to the slider. Pulling or pushing the control means would actuate the slider in order to adjust the flow resistance, i.e. the surface area of the through-flow opening. As the expression indicates, the slider comprises a blocking device slidably supported relative to the through-flow opening, either linearly or having a curved trajectory.

In an advantageous embodiment, the bypass means is located at a rear end of the galley housing and comprises a through-flow opening pointing to a lateral side of the galley assembly, i.e. in a direction substantially parallel to the front side. Hence, the slider may be moved in a direction substantially orthogonal to the extension of the front side and thereby sliding along the through-flow opening. The opening degree of the through-flow opening may be determined by the distance between the control means and the front side. The control means may be realized as a rod-like element.

In a preferred embodiment, the control means is a rod-like element being movably supported relative to the front side. Still further, the largest distance between an operating end and the front side of the housing does not exceed 0.5 m. This allows operating the control means from a position forward the front side of the galley housing with a ceiling element, a top panel or a component in a transition between the front side and a ceiling panel, i.e. a pelmet, is removed. The maximum distance of 0.5 m eliminates the necessity to completely crawl on top of the galley housing for adjustment of the bypass means, as it allows it to move the control means by hand with an arm reaching from the front side to the control means.

In a further advantageous embodiment, the bypass means comprises a segmented or flexible slider, which allows selectively blocking or unblocking a section of the through-flow opening facing away from the front side. By the segmented design it is possible to pull or push the slider around an edge of the bypass means. The through-flow opening facing to the rear end of the galley assembly allows an improved reduction of noise emanating from the through-flow opening.

In the latter case, the control means may be designed as the previous control means, preferably in form of a rod-like mechanical component.

In a still further advantageous embodiment, the bypass means comprises a rotatable blocking means, which extends in the same plane as the through-flow opening, wherein the rotatable blocking means is rotatably supported relative to the through-flow opening and adapted for selectively blocking or unblocking a section of a through-flow opening. This allows an operating end of the control means to reside in a constant position, wherein the control means is rotatably supported on the galley housing. The reachability of the control means is improved, as it does not depend on the opening state of the through-flow opening.

Preferably, the blocking means has the shape of a circular segment, wherein the through-flow opening comprises a correspondingly shaped contour. The blocking means may be turned around the geometrical center of the circle, on which the circular segment depends on, in order to adjust the opening degree of the through-flow opening. The blocking means and the control means comprise corresponding shaft hub connections for the transfer of torque from the operating end to the blocking means.

In a preferred embodiment, the control means comprises an indicating means to visually indicate the opening degree of the through-flow opening. In the case of a linearly movable control means, the indicating means may comprise markings on the control means as well as corresponding markings at or on the galley housing. In case the control means is rotatable, the indicating means may comprise a scale clock-like indicator. Consequently, a reliable adjustment of the bypass means may be accomplished by visually checking the optical indicators on moving the control means.

The embodiment also relates to a cabin of a vehicle, comprising at least one such galley assembly as explained above.

Further, the embodiment relates to an aircraft having a cabin and at least one such galley assembly. In particular, the aircraft comprises a pressurized cabin having a pressure bulkhead at a rear side and a galley segment directly placed in front of the pressure bulkhead.

BRIEF DESCRIPTION OF THE DRAWINGS

The various embodiments described will hereinafter be described in conjunction with the following drawing figures, wherein like numerals denote like elements.

Other characteristics, advantages and potential applications of the present embodiment result from the following description of the exemplary embodiments illustrated in the figures. In this respect, all described and/or graphically illustrated characteristics also form the object of the embodiment individually and in arbitrary combination regardless of their composition in the individual claims or their references to other claims. Furthermore, identical or similar objects are identified by the same reference symbols in the figures.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
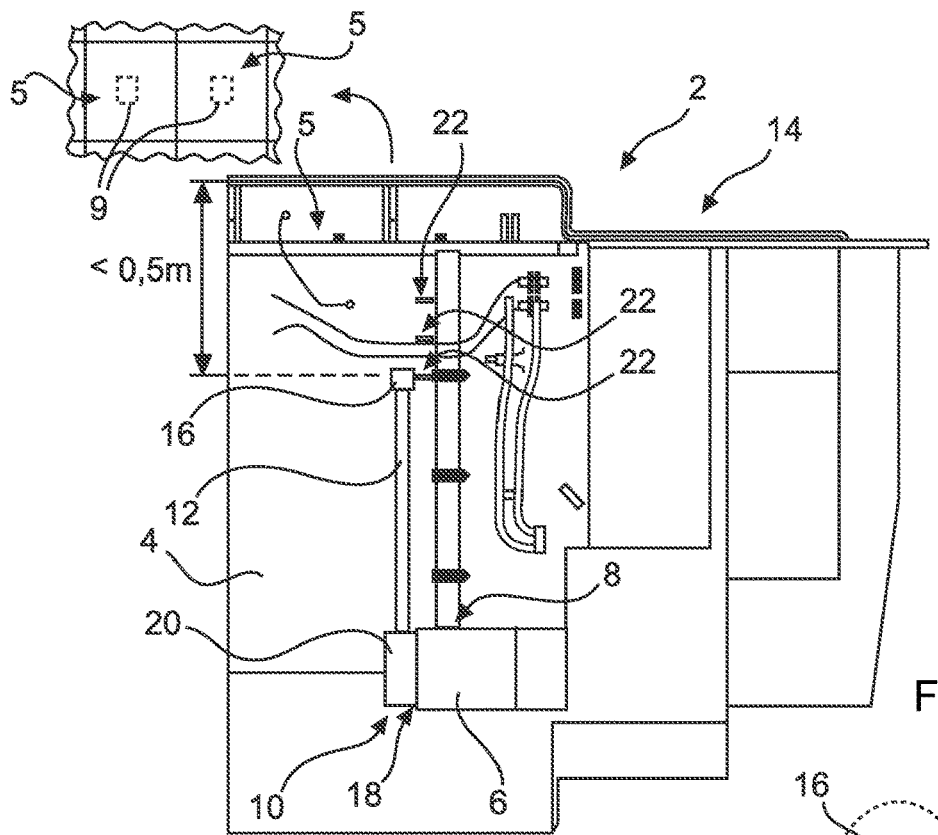
FIGS. 1 and 2 show a first exemplary embodiment of a galley assembly in a top view with two different opening degrees of the bypass means.
Figure 2:
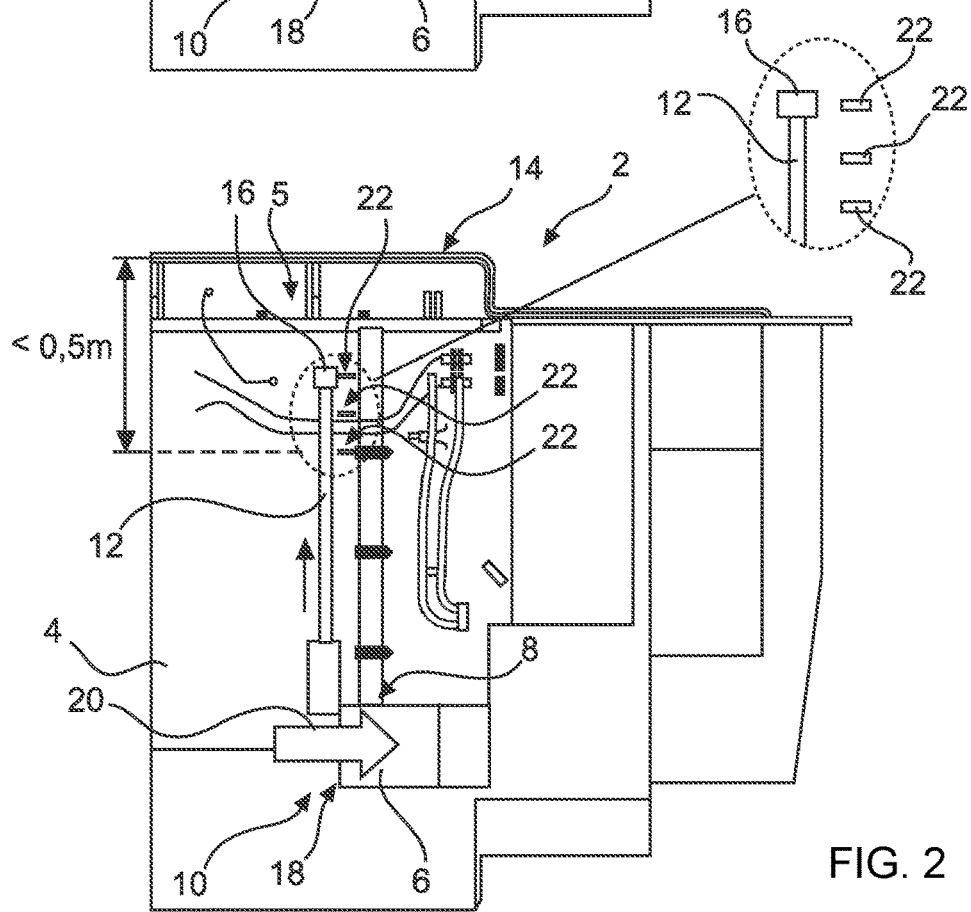

FIGS. 1 and 2 show at least a part of a galley assembly 2 in a cabin of an aircraft in a top view. The galley assembly 2 may extend between two opposite sides of a cabin or may be a galley module of a larger monument having additional facilities. As the varying depth of a galley housing 4 indicates, the galley assembly 2 may be arranged directly in front of a pressure bulkhead, which is not depicted herein in detail.

Accessible from the front side 14, a number of compartments 5 capable for housing kitchen appliances is present. Each of the compartments comprises a ventilation port 9, coupled with an air duct, which is coupled with an air suction port 8, exemplarily situated on top of the housing 4 by means of an air extraction manifold 6, that is also positioned on top of the housing 4 and coupled with the air suction port 8. The air suction port 8 provides a suction pressure and leads to sucking of air into the compartments, leading to the transport of vapor and all arising odors into the air extraction manifold 6.

The air extraction flow rate demand depends on the number of kitchen appliances installed in the galley assembly 2. If not all available compartments are equipped with kitchen appliances, the required extraction flow rate is reduced. However, due to the use of a standard installation for each individual aircraft, which may be individualized by an aircraft operator, the air suction port 8 is adapted for permanently conveying the same flow rate of extraction air through providing a substantially constant pressure difference irrespective of the individual setup. If the extraction of air through at least a part of the compartments is blocked, the extraction flow rate demand decreases. To compensate for this decrease, a part of the extraction flow rate is delivered through a bypass means 10.

The air extraction manifold 6 further comprises a bypass means 10 adapted for sucking of air from the surrounding the bypass means 10 into the air suction port 8 which is coupled with a control means 12. The air extraction manifold 6 is positioned so as to be as far from a front side 14 as possible, in order to reduce the perceptibility of any noise emanating from the bypass means 10. For controlling the degree of opening of the bypass means 10, the control means 12 extends towards the front side 14 and comprises an operating end 16, which may be grabbed by a user for adjusting the bypass means 10.

The bypass means 10 is adapted for selectively blocking or unblocking a through-flow opening 18 exemplarily by means of a slider 20, that is slidably supported along the through-flow opening 18 and which may be moved to the front side 14 or away from it. The operating end 16 is positioned in relation to the slider 20 such that the maximum distance between the front side 14 and the operating end 16 exemplarily is 0.5 m.

Consequently, the achievable flow-rate through the bypass means 10 is adjustable through moving the control means 12. A fully closed through-flow opening 18 stands for a fully equipped galley assembly 2 with a maximum extraction air flow. A fully open through-flow opening 18 stands for a least number of kitchen appliances in the galley assembly 2, with a maximum extraction air flow through the bypass means 10.

To adjust the bypass means 10 to the correct opening degree, the control means 12 and/or the housing 4 may comprise indicators, such as a set of markings for visually indicating the position of the operating end 16 corresponding to the number of installed kitchen appliances. Exemplarily, in the direct vicinity of the operating end 16, a number of placards 22 as indicating means is arranged, which show the number of installed kitchen appliances.

Figure 3:
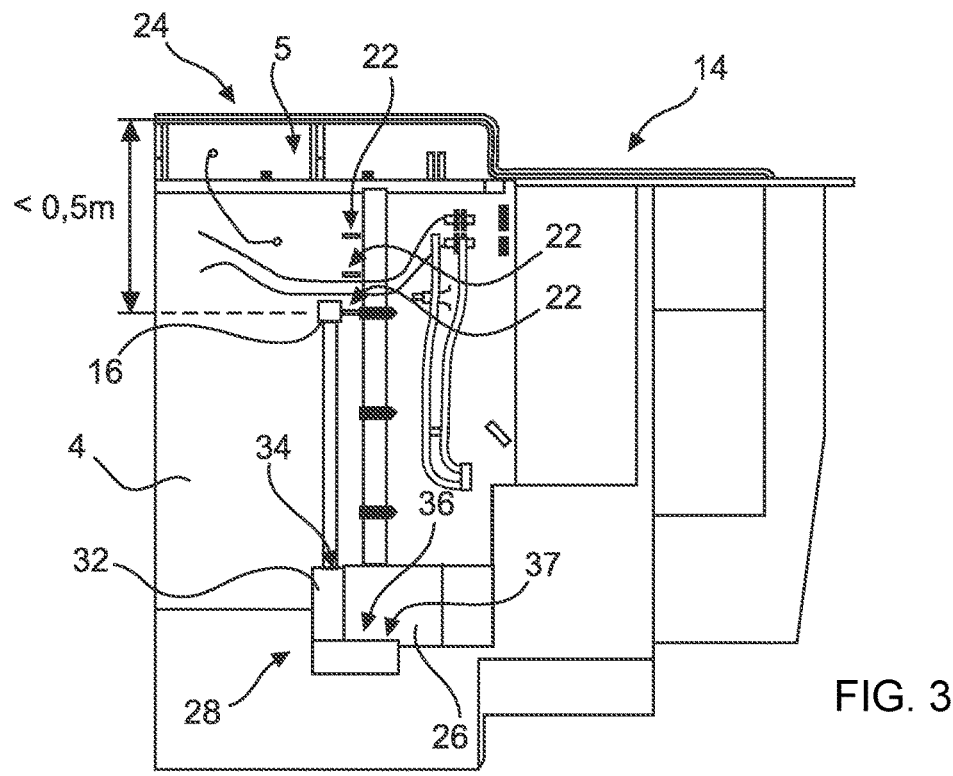
FIGS. 3 and 4 show a second exemplary embodiment of a galley assembly in a top view with two different opening degrees of the bypass means
Figure 4:
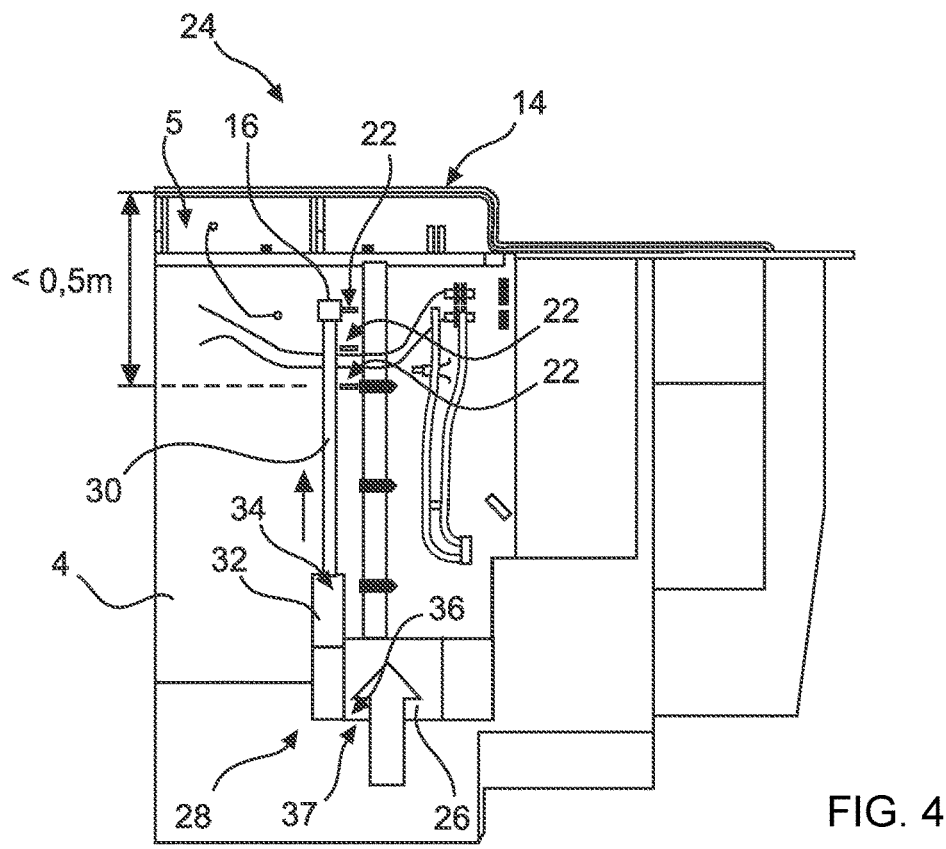
Figure 5A:
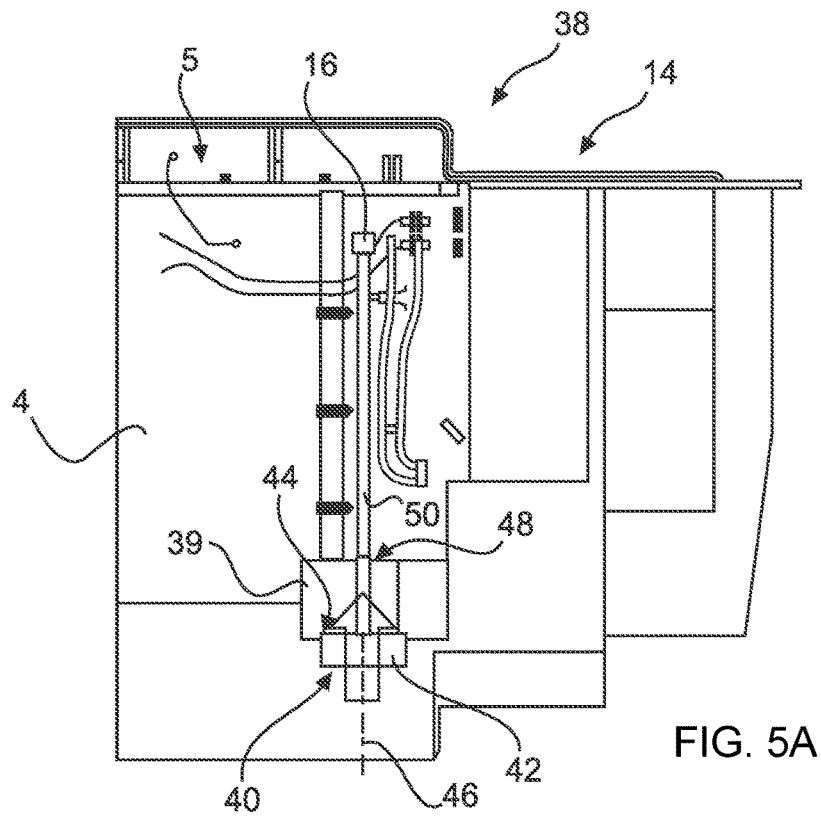
FIGS. 5A, 5B, 5C, 5D and 5E show a third exemplary embodiment of a galley assembly in a top view with three different opening degrees of the bypass means.
Figure 5B:
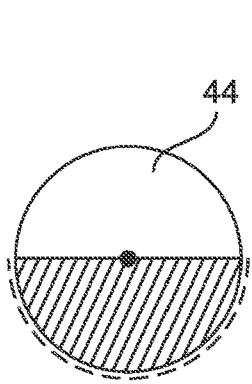
Figure 5C:
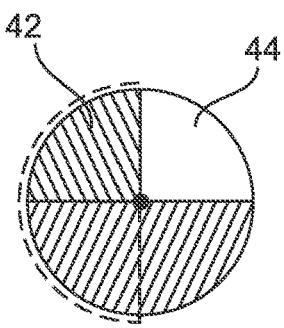
Figure 5D:
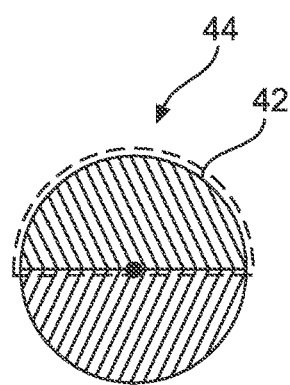
Figure 5E:
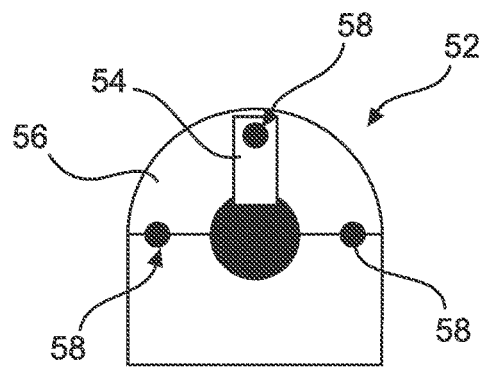

In FIGS. 3 and 4, an alternate solution is shown. Here, a galley assembly 24 comprises an air extraction manifold 26, which comprises a bypass means 28 at a side facing away from the front side 14 of the galley assembly 24. A control means 30 is slidably supported on the galley housing 4 in a direction substantially perpendicular to the mean extension of the front side 14. The control means 30 is coupled with a slider 32 by means of a joint 34, which will be pulled or pushed around an edge 36 of the air extraction manifold 26 for selectively blocking or unblocking a through-flow opening 37. Due to the alignment of the bypass means 28, the noise emission is even more reduced compared to the solution presented in FIGS. 1 and 2, while it has the same degree of simplicity of operation.

In FIG. 3, the bypass means 28 is fully closed, while FIG. 4 shows the bypass means 28 in a fully open state, in which the bypass air flow flows into the air suction port 8 from a side facing away from the front side 14.

FIG. 5A to 5E show a still further exemplary embodiment. Galley assembly 38 comprises an air extraction manifold 39 having a bypass means 40 with a rotatable blocking means 42, which is aligned flush with a through-flow opening 44, that is shaped corresponding to the blocking means 42. The blocking means 42 selectively blocks or unblocks the through-flow opening 44. The blocking means 42 has a shape corresponding to a half segment of a circle around a centre 46. The through-flow opening 44 comprises a similar shape, wherein the opening 44 may be slightly narrower than the extension of the blocking means 42 to allow a precise blocking and unblocking.

The blocking means 42 comprises a connecting means 48 at the centre 46, which may reach completely through the air extraction manifold 39 and which is couplable with an axis-like control means 50 rotatably supported on the housing 4 and reaching forward to the front side 14. By turning the operator end 16, the through-flow opening 44 is selectively blocked or unblocked.

Preferably, the control means and in particular the operating end 16 comprises an indicating means 52, which is exemplarily designed in a clock-like manner having an indicator 54 and a scale 56, wherein the scale comprises markings 58 representing the number of installed kitchen appliances.

As a supplement, it should be noted that "comprising" does not exclude any other elements or steps, and that "a" or "an" does not exclude a plurality. It should furthermore be noted that characteristics described with reference to one of the above exemplary embodiments can also be used in combination with other characteristics of other above-described exemplary embodiments. Reference symbols in the claims should not be interpreted in a restrictive sense.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A galley assembly for a cabin of a vehicle, comprising:
   a galley housing having a front side and a plurality of compartments capable for housing kitchen appliances,
   an air suction port connectable to an air suction line,
   an air extraction manifold having a bypass device, and
   a mechanical control device,
   wherein each compartment comprises a closable ventilation port,
   wherein the air suction port is pneumatically coupled with the air extraction manifold, which is coupled with the ventilation ports of the compartments to provide a negative pressure to suction air through the ventilation ports into the air suction port,
   wherein the bypass device is positioned on an outer surface of the galley assembly facing away from the front side and is adapted for selectively providing a through-flow opening directly at the extraction manifold with an adjustable opening area to a surrounding of the galley assembly to allow air from the surrounding of the galley assembly to flow into the air extraction manifold,
   wherein the control device is coupled with the bypass device and is configured to be gripped by a user on an operating end to transfer motion to the bypass device, and is adapted for adjusting the opening area of the through-flow opening to maintain a total air flow rate into the air suction port when one or more of the ventilation ports is/are closed by changing an amount of air from the surrounding of the galley assembly that flows into the air extraction manifold, and
   wherein the control device is arranged on an outer surface and extends from the bypass device in a direction of the front side wherein the control device comprises an indicating element to visually indicate the opening degree of the through-flow opening, and
   wherein the indicating element comprises markings representing different degrees of opening of the through-flow opening on the control device or on the galley housing.

2. The galley assembly of claim 1,
   wherein the control device is mechanically coupled with the bypass device and
   wherein movement of the operating end of the control device adjusts the bypass device.

3. The galley assembly of claim 1,
   wherein the bypass device comprises a slider, which is adapted for adjusting an opening degree of the through-flow opening by moving the slider to selectively block or unblock parts of the through-flow opening, and
   wherein the control device is movably supported on the galley housing and is coupled with the slider.

4. The galley assembly of claim 1,
   wherein the bypass device is located at a rear end of the galley housing opposite to the front side and comprises a through-flow opening pointing to a lateral side of the galley assembly.

5. The galley assembly of claim 1,
   wherein the control device is a rod-like element being movably supported relative to the front side.

6. The galley assembly of claim 1,
   wherein a largest distance between an operating end of the control device and the front side of the housing does not exceed 0.5 m.

7. The galley assembly of claim 1,
   wherein the bypass device comprises a segmented or flexible slider, which allows selectively blocking or unblocking a section of the through-flow opening.

8. A cabin of a vehicle, comprising at least one galley assembly according to claim 1.

9. An aircraft, comprising a cabin and at least one galley assembly of claim 1.

10. The aircraft of claim 9, comprising a pressurized cabin having a pressure bulkhead at a rear side and a galley assembly directly placed in front of the pressure bulkhead.

* * * * *